(12) United States Patent
Mitsui

(10) Patent No.: US 7,274,820 B2
(45) Date of Patent: Sep. 25, 2007

(54) PATTERN EVALUATION SYSTEM, PATTERN EVALUATION METHOD AND PROGRAM

(75) Inventor: Tadashi Mitsui, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 548 days.

(21) Appl. No.: 10/252,521

(22) Filed: Sep. 24, 2002

(65) Prior Publication Data

US 2003/0059104 A1   Mar. 27, 2003

(30) Foreign Application Priority Data

Sep. 26, 2001   (JP) ............................. 2001-294209

(51) Int. Cl.
*G06K 9/48* (2006.01)
*G06K 9/00* (2006.01)

(52) U.S. Cl. ...................... 382/199; 382/145

(58) Field of Classification Search ................ 382/145, 382/199
See application file for complete search history.

(56) References Cited

U.S. PATENT DOCUMENTS

| 5,136,661 | A | * | 8/1992 | Kobayasi et al. | ............ 382/288 |
| 5,825,914 | A | * | 10/1998 | Tsuboi et al. | ................ 382/151 |
| 6,094,501 | A | * | 7/2000 | Beatty | ......................... 382/154 |
| 6,920,249 | B2 | * | 7/2005 | Rinn et al. | .................... 382/199 |
| 2002/0057839 | A1 | * | 5/2002 | Rinn et al. | ................... 382/199 |

| 2004/0066964 | A1 | * | 4/2004 | Neubauer et al. | ............ 382/152 |

FOREIGN PATENT DOCUMENTS

| JP | 5-280954 | 10/1993 |
| JP | 06-337922 | 12/1994 |
| JP | 7-330356 | 12/1995 |
| JP | 8-161508 | 6/1996 |
| JP | 09-184714 | 7/1997 |
| JP | 11-166813 | 6/1999 |
| JP | 2000-171230 | 6/2000 |
| JP | 2001-101419 | 4/2001 |
| JP | 2001-183116 | 7/2001 |
| JP | 2001-243476 | 9/2001 |

OTHER PUBLICATIONS

Japan Association of Remote Sensing, "Remote Sensing", Chapter 11.6—Minimum Distance Classifier, 1996.*
U.S. Appl. No. 2002/0141647, titled Pattern Evaluation Method, Pattern Evaluation System and Computer Readable-Recorded Medium, published Oct. 3, 2002.

* cited by examiner

*Primary Examiner*—Bhavesh M Mehta
*Assistant Examiner*—John B Strege
(74) *Attorney, Agent, or Firm*—Finnegan, Henderson, Farabow, Garrett & Dunner, L.L.P.

(57) ABSTRACT a pattern evaluation system which receives image data of a pattern to be evaluated to evaluate the pattern includes an edge model producing part which produces a pattern edge model and an edge point coordinate detecting part which carries out an image matching processing to an image of the pattern with the pattern edge model to detect coordinates of an edge point of the pattern.

17 Claims, 10 Drawing Sheets

X100k

X200k

PATTERN EVALUATION SYSTEM, PATTERN EVALUATION METHOD AND PROGRAM

CROSS REFERENCE TO RELATED APPLICATION

This application claims benefit of priority under 35USC § 119 to Japanese patent application No. 2001-294209, filed on Sep. 26, 2001, the contents of which are incorporated by reference herein.

BACKGROUND OF THE INVENTION

1. Field of the Invention

The present invention generally relates to a pattern evaluation system, evaluation method and program for evaluating a pattern by measuring dimension and shape of the pattern.

2. Description of the Prior Art

As an example of a conventional pattern evaluation method, a method for evaluating a fine pattern of a semiconductor will be described below.

Evaluation of a pattern is important in a semiconductor fabricating process. This is particularly conspicuous with respect to a fine pattern formed in a lithography process and/or an etching process. Conventionally, there is generally adopted a method for measuring and evaluating the dimension of a pattern (e.g., a line width in the case of a line pattern, a hole diameter in the case of a hole pattern) by means of a CDSEM (Critical Dimension Scanning Electron Microscope) using electron beams. In a CDSEM, secondary electrons produced from a sample irradiated with primary electron beams are detected by a detector, and a SEM image of a pattern obtained as signal strength of the detected secondary electrons is processed to carry out a pattern evaluation, such as a dimension measurement. As a conventional pattern evaluation method using a CDSEM, a method for obtaining a line width of a line pattern will be described below.

First, a SEM image is acquired by scanning a sample with electron beams in a scanning line direction which is determined so as to be perpendicular to the longitudinal directions of a line pattern formed on the sample. Then, the SEM image is cut out in accordance with a region of interest (ROI) described on a measuring recipe or an ROI assigned by an operator, and is stored in, e.g., an image memory of a computer capable of processing images. Subsequently, assuming that the scanning line direction of the SEM system is X direction, an intensity distribution curve (a line profile) is prepared for every line pixel of the cut image in X direction. From this profile, coordinates of edge points of the pattern are extracted by, e.g., the threshold method. In this case, right and left two edge points (X-coordinates) are extracted. Then, the distance between these edge points (the difference between the X-coordinates) is determined as the width of this line pixel of the line pattern, and the width of each line pixel is calculated. The mean value of the calculated values in the longitudinal directions of the ROI is finally outputted as the width of the line pattern. There are some cases where the calculated value fluctuates due to noises of the image. Therefore, in order to remove this fluctuation, for example, the mean value of the widths of three line pixels including upper and lower line pixels may be obtained to determine the mean value as the width of the line pixel, or the mean value of values of distance between the edge points in the longitudinal directions of the ROI may be finally outputted as the width of the line pattern. Furthermore, if the variation in width in the longitudinal directions of an ROI is small like a line pattern, the calculation time is generally shortened by thinning line pixels to calculate the width.

Then, the following two steps are required for carrying out an image processing when the dimension of a pattern is to be measured. That is, there are required a step of detecting the edge of the pattern using an edge detecting algorithm, and a step of calculating the dimension of the pattern by a CD measuring algorithm suitable for the object of measurement. There are some method for the CD measuring algorithm of these algorithms such as a method in which the mean value of distance between edge points is used like the above example and a simple method in which, e.g., the maximum or minimum distance between edge points is calculated as the maximum or minimum line width in the case that a line pattern does not have a constant width as well as a method requiring a complicated calculating procedure as disclosed in Japanese Patent Laid-Open No. 2000-171230. In either of these methods, the threshold method, the straight line approximation, the maximum gradient method or the like is used as the pattern edge detecting algorithm prior to the method. These methods in the prior art are described in Japanese Patent Laid-Open No. 9-1 84714.

However, in the above described conventional method for detecting the edge points of the pattern, there are some cases where no edge can be detected or an incorrect edge is detected by mistake, in accordance with the shape and arrangement of the pattern. In the above described conventional method, there are also some cases where the measured value of the dimension of the pattern varies in accordance with the size of the ROI for cutting out the pattern. In addition, in the above described conventional method, it is necessary to assign the ROI. Therefore, if the shape of the pattern is complicated, it is required to carry out a complicated procedure of assigning the ROI, so that the burden on the operator increases and the reliability of automatic measurement decreases. In addition, in the above described conventional method, there are some cases where the measured value of the dimension of the pattern varies in accordance with the variation in contrast/brightness of the pattern or the variation in tapered angle of the side wall of the pattern. Moreover, in the above described conventional method, there is a problem in that the measured value or the like of the dimension of the pattern depends on the magnification in measurement.

BRIEF SUMMARY OF THE INVENTION

According to a first aspect of the present invention, there is provided a pattern evaluation system which receives image data of a pattern to be evaluated to evaluate the pattern, the pattern evaluation system comprising: an edge model producing part which produces a pattern edge model; and an edge point coordinate detecting part which carries out an image matching processing to an image of the pattern with the pattern edge model to detect coordinates of an edge point of the pattern.

According to a second aspect of the present invention, there is provided a pattern evaluation method comprising: acquiring an image data of a pattern to be evaluated; producing a pattern edgemodel; and carrying out an image matching processing to an image of the pattern with the pattern edge model to detect coordinates of an edge point of the pattern.

According to a third aspect of the present invention, there is provided a program which causes a computer to execute a pattern evaluation method comprising: acquiring an image data of a pattern to be evaluated; producing a pattern edge model; and carrying out an image matching processing to an image of the pattern with the pattern edge model to detect coordinates of an edge point of the pattern.

DETAILED DESCRIPTION OF THE INVENTION

Referring now to the accompanying drawings, some embodiments of the present invention will be described below. In the following embodiments, evaluation of a fine pattern of a semiconductor using a pattern image obtained by a CD-SEM system will be described. However, the present invention should not be limited to this field and CD-SEM system, and can be applied to various industrial fields as a new technique for measuring dimension and shape of a pattern in general.

(A) Embodiment of Pattern Evaluation System

Figure 1:
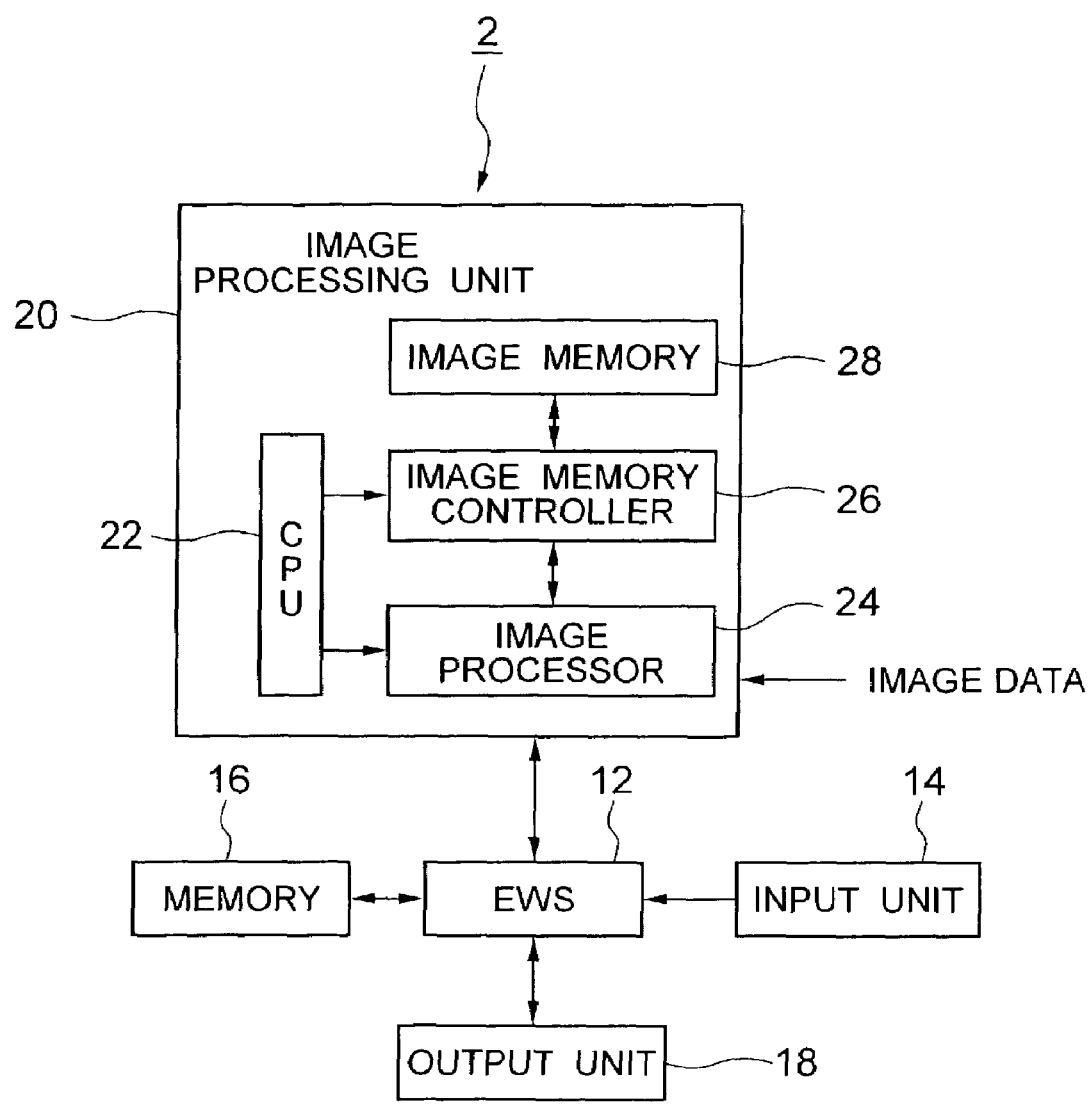
FIG. 1 is a block diagram showing a schematic construction of an embodiment of a pattern evaluation system according to the present invention.

FIG. 1 is a block diagram showing a schematic construction of an embodiment of a pattern evaluation system according to the present invention. The pattern evaluation system 2 shown in this figure comprises a work station (Engineering Word Station) 12, an input unit 14, a memory 16, an output unit 18 and an image processing unit 20.

The memory 16 is designed to store a recipe file in which algorithm in a pattern evaluation method according to the present invention is described. The work station 12 is designed to read the recipe file from the memory 16 to control the whole system in accordance with the recipe file, to detect coordinates of a pattern edge by an image processing, which will be described later, and to carry out a pattern evaluation, such as a pattern measurement, based on the detected coordinates of the pattern edge. The input unit 14 is an input means, such as a key board or mouse. The output unit 18 is designed to receive image data of a pattern edge model, which will be described later, and data of an image (which will be herein after referred to as an image for measurement) of a pattern being an object to be evaluated (which will be hereinafter referred to as a pattern to be evaluated), from the image processing unit 20 via the work station 12, and displays the images by means of a display (not shown).

The image processing unit 20 includes a CPU 22, an image processor 24, an image memory controller 26 and an image memory 28.

The image processor 24 is designed to produce a pattern edge model, to receive image data, such as SEM image data, and to carry out an image processing which will be described later. The image processor 24 can also be set so as to cause a range assigning window for defining an edge of a pattern to be evaluated on an actual image displayed by the data output unit 18, and another window for separately displaying an image of an assigned range to be displayed on a screen, in producing a pattern edge model from the actual image as will be described later.

The image memory 28 has a plurality of storage regions for storing SEM image data and pattern edge model data in different storage regions under the control of the image memory controller 26.

Referring to the accompanying drawings, the operation of the pattern evaluation system 2 shown in FIG. 1 will be described as embodiments of a pattern evaluation method according to the present invention. Furthermore, the same reference numbers are given to the same portions in the following drawings, and repetitive descriptions thereof are omitted.

(B) Embodiments of Pattern Evaluation Method

Some embodiments of a pattern evaluation method according to the present invention will be described below.

(1) First Embodiment

First, referring to FIGS. 2 through 10, the first embodiment of a pattern evaluation method according to the present invention will be described below. In this embodiment, the measurement of a line pattern will be described.

Figure 2:
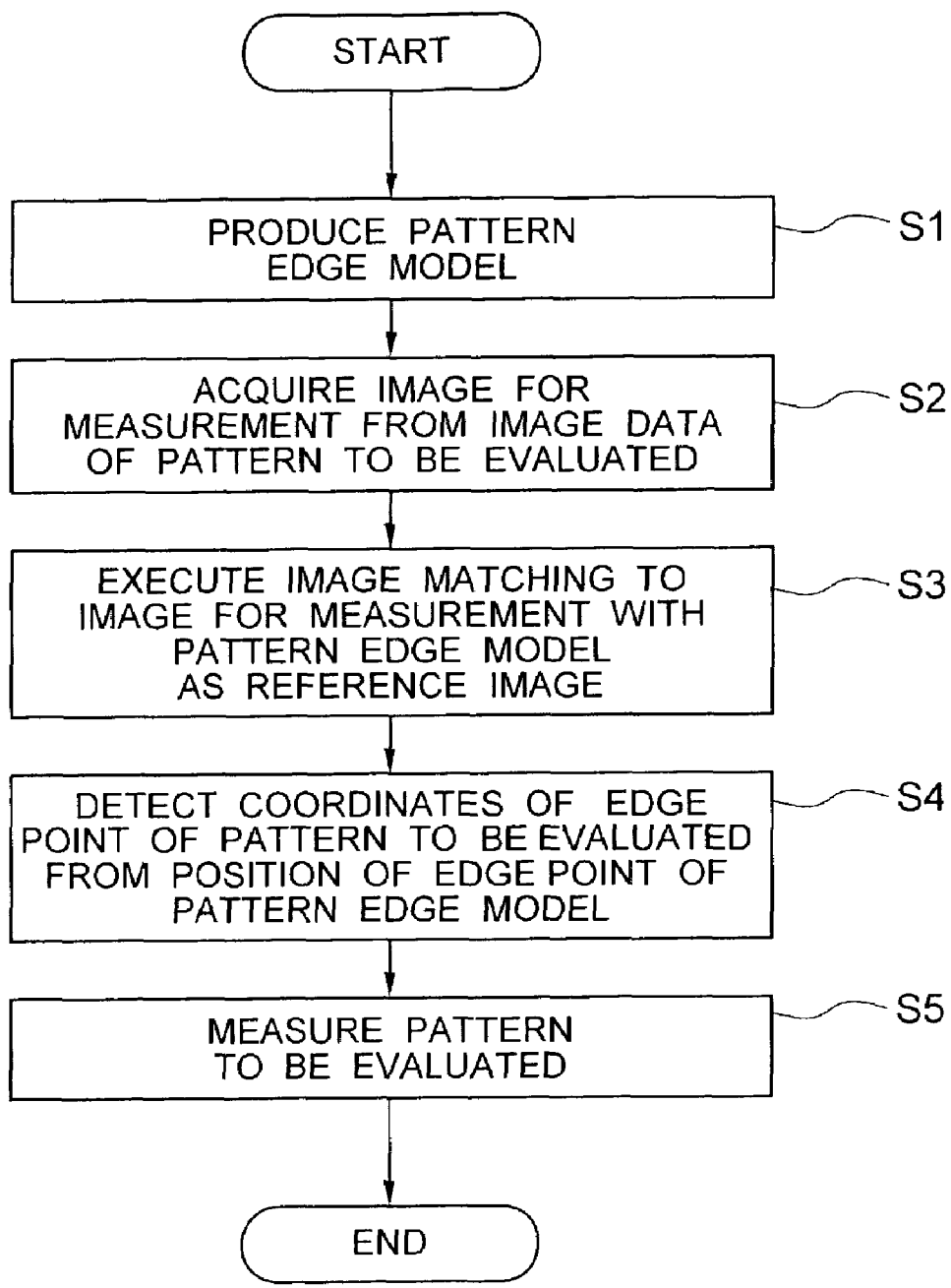
FIG. 2 is a flow chart for explaining a schematic procedure in a first embodiment of a pattern evaluation method according to the present invention.
Figure 3A:
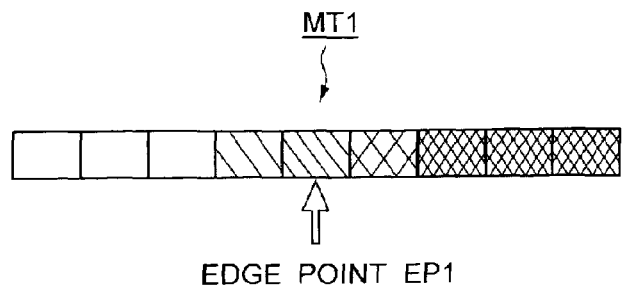
FIGS. 3A through 3C are schematic diagrams showing examples of a pattern edge model.
Figure 3B:
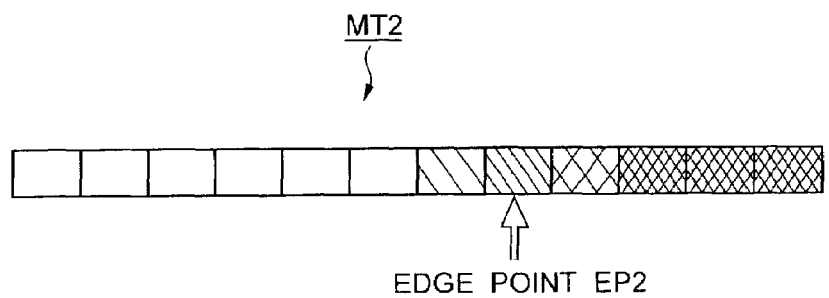
Figure 3C:
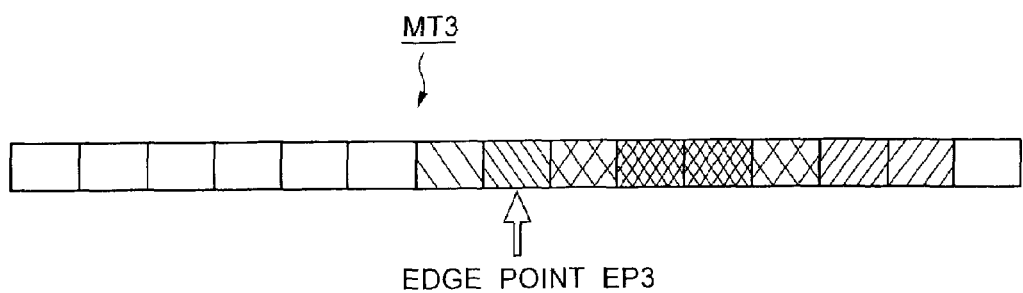

FIG. 2 is a flow chart for explaining a schematic procedure in this embodiment. As shown in this figure, prior to the detection of pattern edge points, a pattern edge model is previously produced (step S1). Examples of pattern edge models in this embodiment are shown in FIGS. 3A through 3C. Each of pattern edge models MT1 through MT3 shown in these figures are an array of pixels wherein intensity values of 8 bits are stored, and the position of each of edge points EP1 through EP3 is also defined in each model. Each of the edge points of the pattern edge model is herein defined as an edge point detected when the pattern to be evaluated is viewed from left to right. In fact, the pattern edge model is stored in the image memory 28 of the image processing unit 2 as numerical values. It is not required to execute the procedure at this step 1 for every measurement if a pattern edge model is previously registered.

Then, image data of a pattern to be evaluated are acquired from a SEM system or optical image pick-up device (not shown), and an ROI is cut out in accordance with the recipe file or the operator's operation to acquire an image for measurement (step S2). While the ROI has been assigned in this embodiment, it is possible to carry out a measuring process in a pattern evaluation method according to the present invention as will be described later even if the ROI is assigned.

Figure 4:
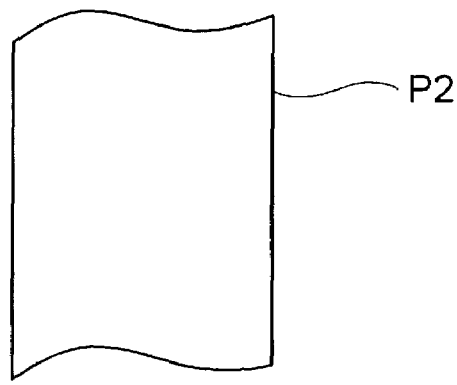
FIG. 4 is a partially enlarged view of an edge line of an example of a line pattern being an object to be evaluated.
Figures 5A, 5B:
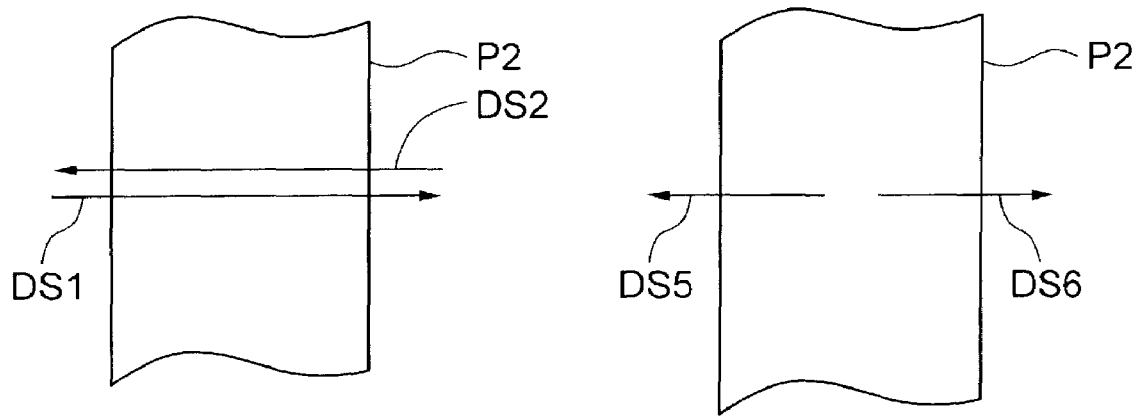
FIGS. 5A and 5B are conceptual drawings for explaining an image matching process shown in FIG. 2.

Then, with respect to a line pattern, e.g., P2 shown in the partially enlarged view of FIG. 4, the above described pattern edge model is used as a reference image to carry out an image matching (step S3 in FIG. 2). In this step, as shown in FIG. 5A, the image for measurement is scanned with the reference image from left to right in horizontal directions (arrow DS1), the reference image is reversed in left and right to form a new reference image, and the image for measurement is scanned with the new reference image in the opposite direction (arrow DS2). By the image matching process, the position of a reference image is detected which gives the locally maximum correlation between the pattern edge model and an intensity value pattern. At this time, with respect to a pixel in which an edge may exist, the processing range for the image matching is preferably restricted on the basis of the intensity value of the pixel, the dispersion value thereof, the matching score with the reference image, and any other value calculated by all image processing capable of being defined for every pixel, to shorten the processing time.

Figure 6A:
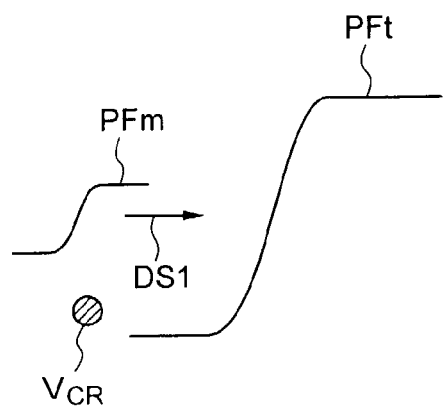
FIGS. 6A through 6E are conceptual drawings for explaining a specific method of the image matching process shown in FIG. 2.
Figure 6B:
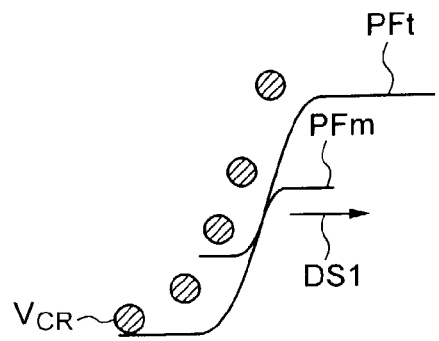
Figure 6C:
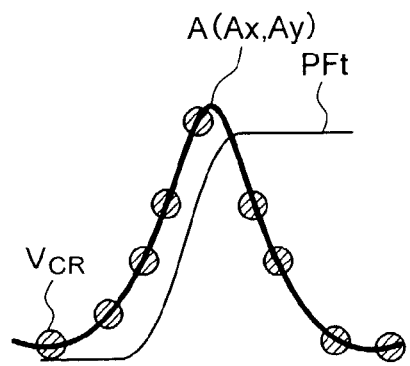
Figure 6D:
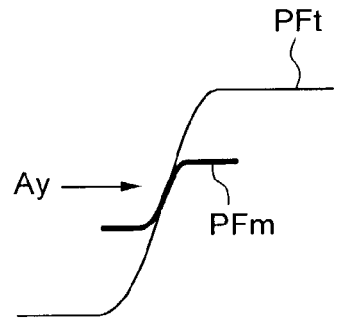
Figure 6E:
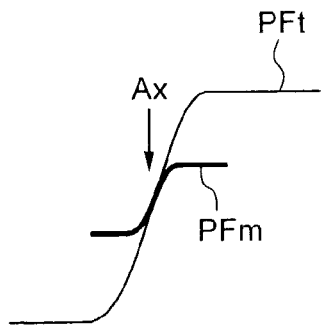

Referring to FIGS. 6A through 6E, the details of a method for an image matching process will be described below. FIGS. 6A through 6E are conceptual drawings wherein the intensity of pixels in an image for measurement and an edge portion of a pattern edge model is taken in Y-axis direction. First, as shown in FIG. 6A, a correlation to a portion of an object image corresponding to the pattern edge model is calculated for every pixel, to plot correlation values $V_{CR}$. As shown in FIG. 6B, the correlation values $V_{CR}$ increase as the pattern edge model approaches the edge of a pattern to be evaluated by scanning the object image with the reference image. These operations are carried out over all of the regions assigned by the ROI in the image for measurement, or in the processing region restricted by the above described pixel value. Then, as shown in FIG. 6C, the correlation values $V_{CR}$ obtained for every pixel are approximated by, e.g., a Gaussian function, and the maximum point A (Ax, Ay) thereof is obtained with precision of sub-pixel. As shown in FIG. 6D, the Y-coordinate Ay at the maximum point A denotes the intensity of the edge. In this embodiment, in order to distinguish the edge from noises, it is assumed that the edge has an intensity which is equal to or greater than a predetermined value. As shown in FIG. 6E, the X-coordinate Ax at the maximum point A denotes the X-coordinate of an edge point of the pattern to be evaluated. In order to exactly detect the position of the edge point, an offset is added on the basis of the edge point defined by the pattern edge model.

By the above described processing, the coordinates of the position corresponding to the position defined by the edge point EP of the pattern edge model are obtained as the coordinates of the edge point of the line pattern P2 (step S4).

The image matching processing may include positive-negative reversal of the reference image, intensity adjustment to the edge of the reference image, and rotation, enlargement and/or reduction of the reference image. As an alternative reference image scanning method other than the above described method, the center of the line pattern P2 is first detected, a horizontal direction outward from the center of the line pattern P2 and a horizontal direction inward to the center of the line pattern P2 are set as scanning directions and the image for measurement is scanned with a reference image according to each of outward and inward direction (arrows DS5, DS6) as shown in FIG. 5B. Thus, the time required to carry out the image matching can be shortened.

Referring to FIG. 2 again, after the edge point is detected, a pattern to be evaluated is measured by calculating the line width of the line pattern P2 by an appropriate algorithm, or the like (step S5). As an example of line width calculating method, as described above, the edge points of a line on a horizontal line on the right and left sides may make pairs to calculate the (horizontal) distance of each pair of edge points to average the distance values in the longitudinal directions of the ROI to output the mean value as a line width. As another method, the pattern width may be calculated by the DAD method described in U.S. patent application Ser. No. 10/105,387 filed on Mar. 26, 2002. This method is suitable for the measurement of a pattern having a complicated shape, since the formed pairs are not restricted on the horizontal line. The contents of U.S. patent application Ser. No. 10/105,387 are incorporated by reference herein.

Figure 7:
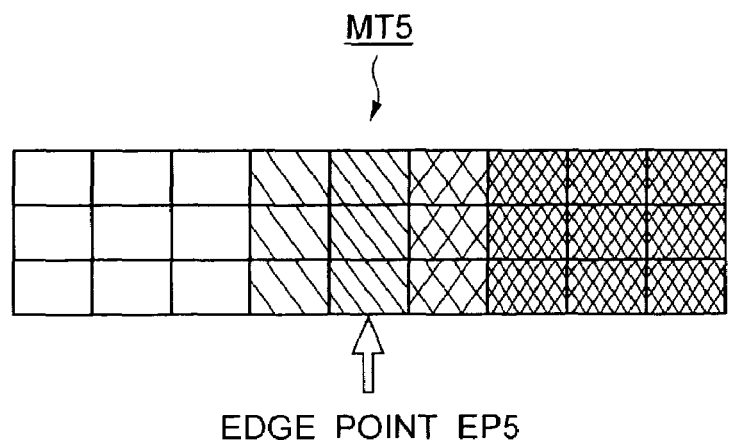
FIG. 7 is a schematic diagram showing an example of a pattern edge model having a plurality of pixels in Y directions in addition to X-directions.
Figure 8A:
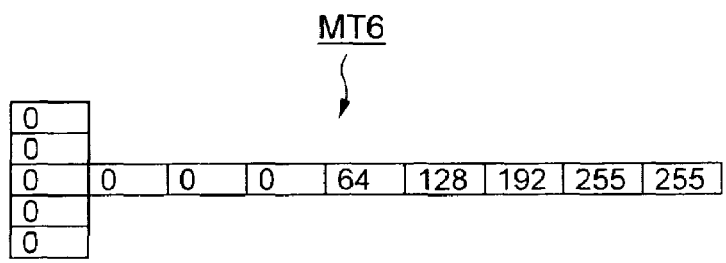
FIGS. 8A through 8C are schematic diagrams showing an example of a pattern edge model having a shape other than a rectangle.
Figure 8B:
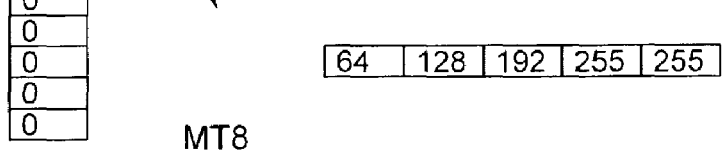
Figure 8C:
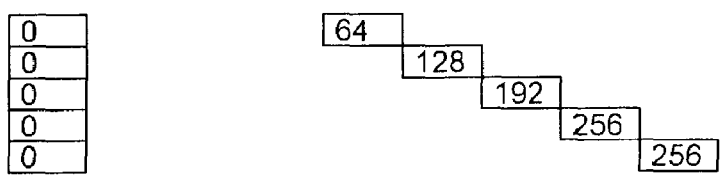

Some measures to avoid a mistake in an image matching due to shot noises of an image for measurement will be described below. First, in each of the pattern edge models shown in FIGS. 3A through 3C, the number of pixels of the pattern edge model in Y directions is one. However, the pattern edge model may have a plurality of pixels like a pattern edge model MT5 shown in FIG. 7. while the number of pixels of the pattern edge model itself in Y directions remains one, the number of pixels in Y directions may be assigned on software during the image matching. In addition, the shape of the pattern edge model should not be limited to a rectangle, such as each of the above described model MT1 through MT5. For example, as shown in FIGS. 8A through 8C, any shape may be used for a pattern edge model.

Thus, according to this embodiment, the pattern edge model wherein the relative intensity values and the positions of the edge points are defined is produced, and this pattern edge model is used as the reference image for carrying out the matching with the image for measurement, so that the edge point can be precisely and efficiently detected with respect to a pattern which can not be detected by conventional methods. When a pattern edge model having a plurality of pixels in a direction perpendicular to a scanning direction is used, it is possible to carry out the detection of edge points resistant to image noises, so that it is possible to prevent false detection.

Figure 9:
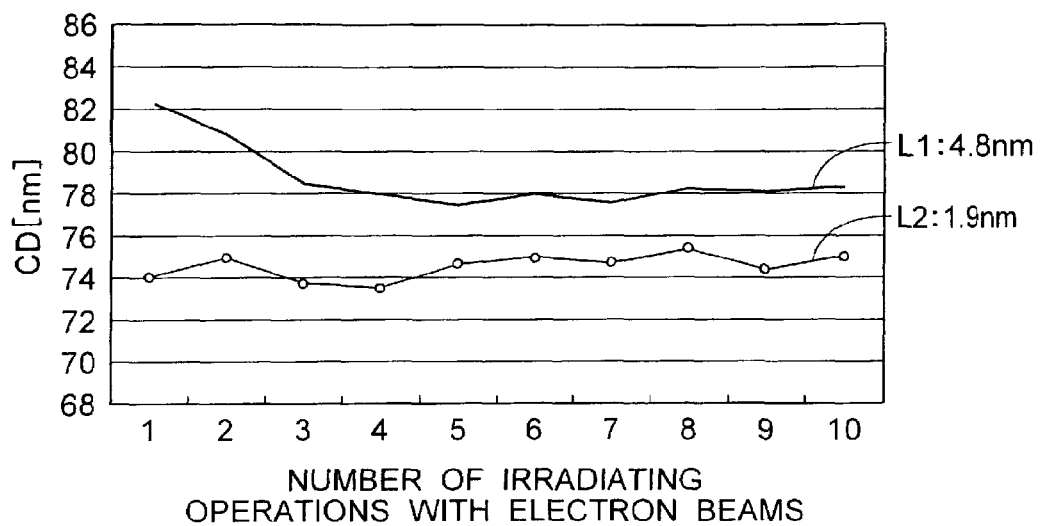
FIG. 9 is a graph showing an example of a measured result in comparison with a result by conventional method, when the same line pattern is irradiated with electron beams ten times.
Figure 10:
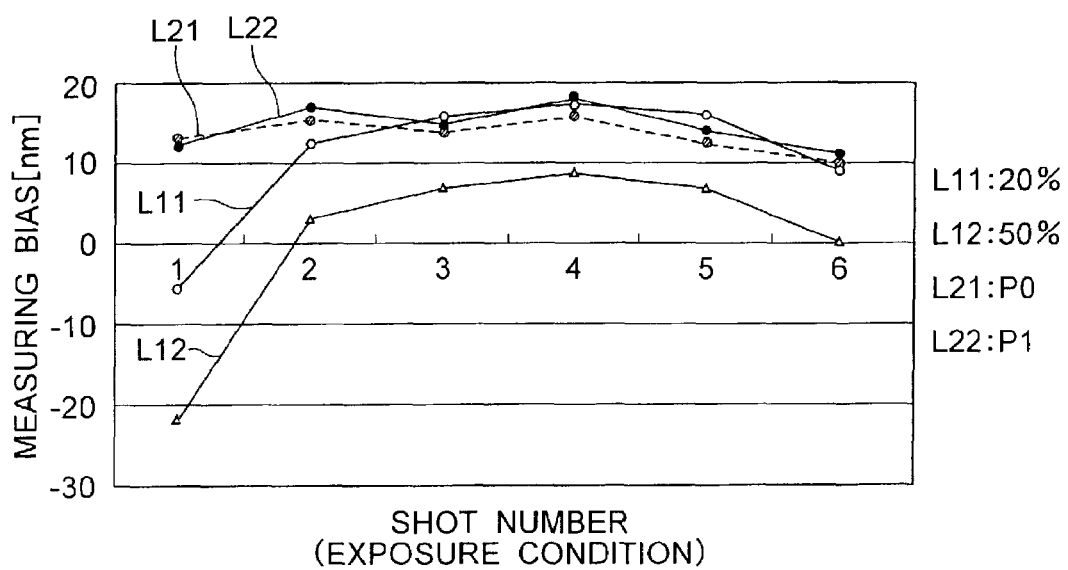
FIG. 10 is a graph showing an example of a measured result in comparison with a result by conventional method, with respect to patterns prepared by changing exposure conditions.

According to a pattern evaluating method in this embodiment, even if the contrast and cross-sectional shape of the pattern to be measured varies in accordance with a method for acquiring its image data, a certain edge point can be detected. Referring to FIGS. 9 and 10, this point will be described below.

According to a conventional measuring method, if the same line pattern is irradiated with electron beams a plurality of times, the drift of the measured value occurs. The reason of the drift is occurrence of charging in the pattern to be evaluated due to the irradiation with electron beams, thereby causing the contrast of the image to change. FIG. 9 shows an example of a measured result when the same line pattern is continuously irradiated with electron beams ten times. As shown by a measured value L1 in FIG. 9, the great drift of the measured value occurs as a result of charging in the conventional measuring method. On the other hand, as shown by a measured value L2 in this figure, the drift is small in the measurement using the method in this embodiment.

Moreover, FIG. 10 is a graph showing a measured result in comparison with a result in a conventional method, with respect to a pattern prepared by changing exposure conditions. In FIG. 10, a measuring bias corresponding to a difference from a measured value by the cross-section SEM is expressed on Y-axis. The variation in exposure conditions causes the variation in shape of the pattern, e.g., the variation in angle of the side wall. Therefore, as shown by the measured results L11 and L12 in FIG. 10, it can be seen that the measuring bias remarkably depends on exposure conditions in the conventional method. On the other hand, as shown by the measured results L21 and L22 in the figure, according to the evaluating method in this embodiment, it can be seen that the dependence of the pattern to be measured on the cross-sectional shape of the pattern can be reduced if the pattern edge model is appropriately selected. Then it can also be seen that another pattern edge model may be selected if the dependence of the measuring bias on the cross-sectional shape of the pattern is intended to remain, e.g., in order to increase the sensitivity of detection of abnormality of exposure conditions or the like. Thus, according to this embodiment, it is possible to carry out the measurement in accordance with purposes of measurement.

Conventionally, in order to detect an edge of a pattern having a complicated shape, the ROI of the complicated shape according to the pattern to be evaluated must be assigned. Thus, when the ROI is assigned, it is required to carry out a complicated procedure and use many parameters. As a result, the user must carry out complicated operations, or it is difficult to carry out an automatic measurement.

In contrast, according to this embodiment, as described above, it is not required to assign the ROI, so that it is possible to easily detect a pattern edge point even in the case of any shape, e.g., a concave closed curved pattern. In addition, even if a plurality of hole patterns exist in a single image for measurement, it is possible to detect edge points of all of patterns without any need of the assignment of a complicated ROI.

Of the above descriptions, the aspect of the present embodiment in that there is no dependence on the variations in image contrast and/or exposure conditions and that the assignment of the ROI is not required are common to the following second through fifth embodiments.

(2) Second Embodiment

Figure 11A:
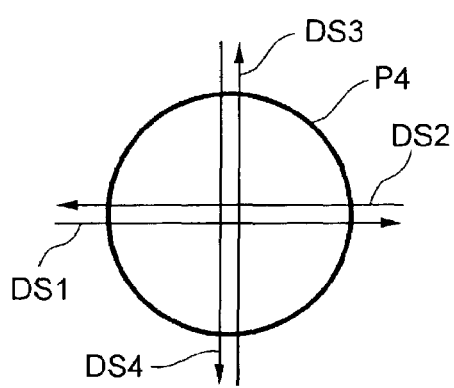
FIGS. 11A and 11B are conceptual drawings for explaining a second embodiment of a pattern evaluation method according to the present invention.
Figure 11B:
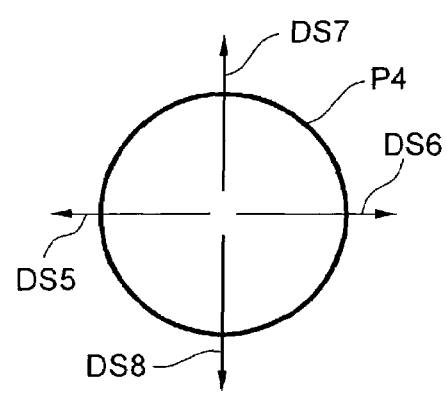

Referring to FIGS. 11A and 11B, the second embodiment of a pattern evaluation method according to the present invention will be described below. In this embodiment, the detection of an edge of a closed curve, such as a hole pattern, will be described.

As a pattern edge model, the same models as those described in the first embodiment are considered. In the case of a closed curve, edge points are distributed in all directions unlike the line pattern. For that reason, it is impossible to carry out the measurement while the scanning direction of a reference image is fixed in horizontal directions. Therefore, for example, as shown in FIG. 11A, it is possible to detect edge points in all directions by scanning a hole pattern P4 in the Y directions DS3 and DS4 in addition to X directions DS1 and DS2 with reference images each of which corresponds to Y directions DS3 and DS4, and to Y directions DS3 and DS4, respectively. As shown in FIG. 11B, similar to the first embodiment (see FIG. 5B), the center of the hole pattern P4 is first detected, and the image for measurement is scanned outward in X directions DS5 and DS6 and outward in Y directions DS7 and DS8 or inward in the respective directions with a reference image corresponding to the respective directions, so that the edge point detecting time can be shortened. While the scanning direction of the reference has been rotated and the angular interval of the rotation is set to 90 degrees in this embodiment, the scanning direction of the reference image may be rotated at arbitrary angular intervals depending on a pattern to be evaluated. In this case, although the relationship between the detection precision and detection time of edge points is a trade-off relationship, good results are obtained at angular intervals of 45 degrees in the case of a typical hole pattern. As the number of pixels of the pattern edge model in Y directions decreases, the precision of detection of edge points is enhanced.

After the edge points are detected by the above procedure, a usual procedure of measuring a hole pattern can be used. In addition to hole patterns, by using the method in this embodiment even in the case of the line pattern, it is possible to detect edge points even in the case of a line pattern having a curved portion due to the variation in width in longitudinal directions, or even if a plurality of line patterns are mixed in a single image for measurement at various angles.

(3) Third Embodiment

For a pattern edge model, the array of pixels, the intensity values stored therein, and the positions of the edge points must be defined prior to the detection of the edge points. These defined data comprise, e.g., matrix data, as shown in FIG. 7, and can be simply prepared and edited by the operation of a numerical value file. In this embodiment, however, there is provided a method for producing a pattern edge model from an actual image without operating such a numerical file.

First, prior to the preparation of a pattern edge model, a range assigning window is used for assigning a portion of an image to be defined as an edge on an actual image displayed by the output unit 18 (see FIG. 1), by means of an appropriate input unit 14, e.g., a mouse. At this time, it is convenient to set the image processor 24 so that the assigned range is enlarged to be displayed on another window.

Then, the edge of the pattern is defined and displayed on the actual image or the image in the enlarged assigned range by operation of the input unit 14. Similarly, the pixel layout of the pattern edge model is assigned by means of the mouse or the like. From the actual image data thus obtained, the pattern edge model is prepared by inserting the intensity value and the definition of the edge point into the assigned pixel layout. At this time, there is considered a case where it is require to carry out the image processing of, e.g., the mean value of pixels. Alternatively, a pattern edge model may be prepared by using a method for sampling a line profile of the intensity value in accordance with a required array of pixels. Furthermore, when the pattern edge model is produced from the actual image, the intensity value of the pixels at the edge point assigned by the user, the dispersion value, the matching score with the reference image, and other values obtained by all image processing capable of being defined for every pixel is read as parameters and these parameters may be used as teacher data to calculate the Mahalanobis distance from them, thereby more precisely determining the processing range for the image matching.

Thus, according to this embodiment, since the pattern edge model is produced from the actual image for measurement, it is possible to rapidly produce an appropriate pattern edge model, so that it is possible to detect coordinates of edge points of the pattern to be evaluated as the operator visually recognizes.

(4) Fourth Embodiment

In the above described embodiments, the prepared pattern edge model is also suitable for images for measurement in any magnification. However, in order to improve the precision of detection of edge points, it is desired to optimize the pattern edge model in accordance with the magnification of the image for measurement. That is, if considered on the same pattern, as the magnification of the image for measurement decreases, the number of pixels assigned to the edge of the pattern edge model decreases. Inversely, as the magnification increases, the number of pixels increases. This point causes a problem as a dependence of a measured value of a pattern dimension on the magnification in observation in the conventional measuring method. In order to avoid this problem, a method disclosed in japanese Patent Laid-Open No. 9-184714 has been proposed. However, this method requires the processing time to change the magnification in measurement, and the magnification in measurement is greatly restricted by the performance of the electron optical system of the measuring system. As a result, it has been difficult to adapt the above conventional method to various kinds of patterns.

Figure 12A:
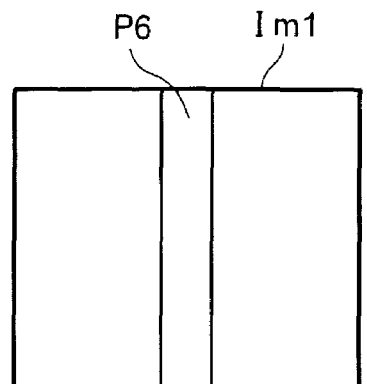
FIGS. 12A through 12D are conceptual drawings for explaining a fourth embodiment of a pattern evaluation method according to the present invention.
Figure 12B:
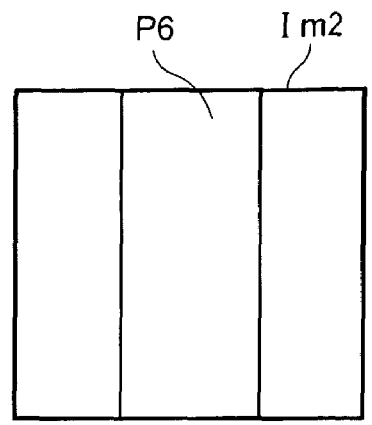
Figure 12C:
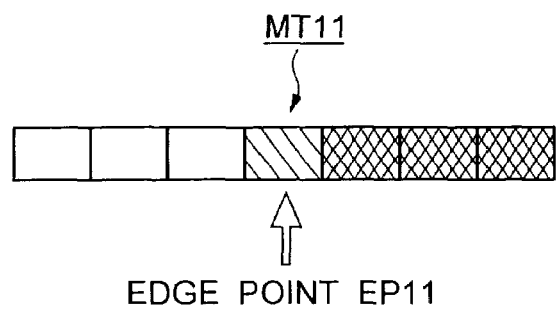
Figure 12D:
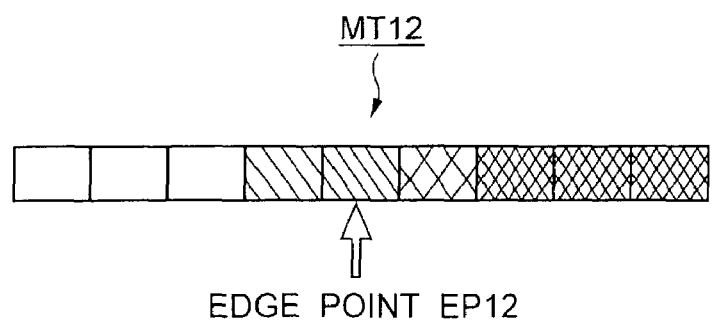

In the pattern evaluation method in this embodiment, the number of pixels of the pattern edge model is flexibly changed in accordance with the magnification in measurement. That is, with respect to the same line pattern P6, when the magnification in measurement is, e.g., x100 k, as shown in FIG. 12A, a pattern edge model having one pixel assigned to an edge point is produced such as a pattern edge model MT11 shown in FIG. 12C. On the other hand, when the magnification in measurement is, e.g., x200 k, as shown in FIG. 12B, a model in which an edge point is assigned in a large number of pixels is produced such as a pattern edge model MT12 shown in FIG. 12D. Such a change of model can be automatically carried out in accordance with the magnification in measurement if a corresponding algorithm is described in the recipe file.

Thus, according to this embodiment, the optimum pattern edge model can be produced with respect to an image for measurement having any magnification. Thus, it is possible to reduce the dependence of the dimension of the pattern on the magnification in measurement.

By the detection of an edge point in the above described first through third embodiments, there is an advantage in that the magnification in measurement can be more freely selected than the prior art since the dependence on the magnification in measurement is originally low. However, in order to further improve the precision of detection of an edge point, it is more advantageous to use the method in this embodiment.

(5) Fifth Embodiment

Figure 13:
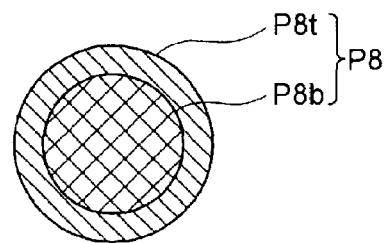
FIG. 13 is a schematic diagram showing an example of a pattern being an object to be evaluated in a fifth embodiment of a pattern evaluation method according to the present invention.
Figure 14:
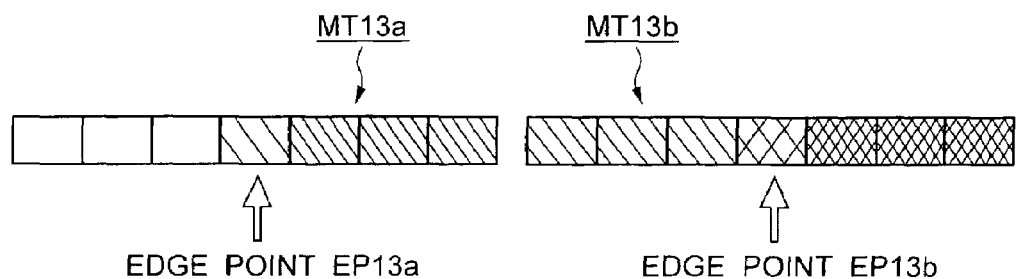
FIG. 14 is a schematic diagram showing examples of two pattern edge models for use in the fifth embodiment of a pattern evaluation method according to the present invention.
Figure 15:
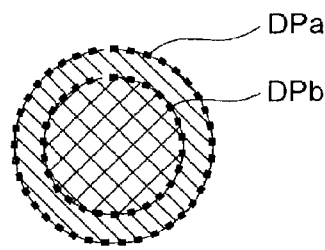
FIG. 15 is a schematic diagram showing effects of the fifth embodiment of a pattern evaluation method according to the present invention.
Figure 16:
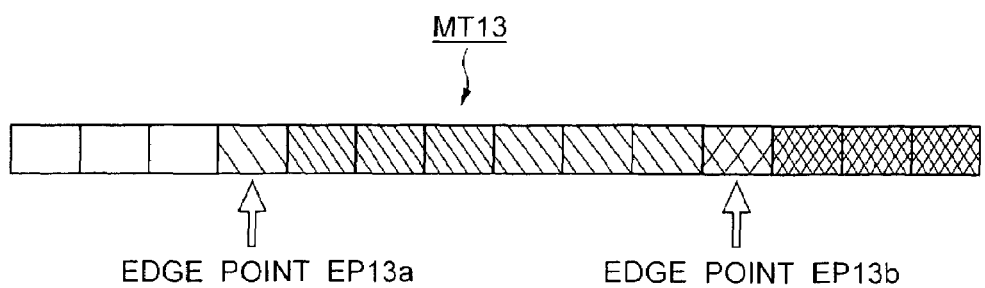
FIG. 16 is a conceptual drawing showing an example of a pattern edge model wherein a plurality of edge points are defined.

In this embodiment, there is provided a method for detecting an edge point in a complicated pattern by adapting a plurality of pattern edge models to a single pattern in an image for measurement. For example, as a pattern to be evaluated P8 shown in FIG. 13, when the shape P8t of the top (top layer) and the shape P8b of the bottom (bottom layer) are mixed in the same image since the side wall is tapered, two pattern edge models, e.g., models MT13a and MT13b shown in FIG. 14, are produced to be used as reference images to carry out an image matching processing. Thus, as shown in FIG. 15, it is possible to simultaneously detect edge points DPa and DPb corresponding to the pattern edge models MT13a and MT13b, respectively. In place of these two pattern edge models MT13a and MT13b a single pattern edge model having two edge points may be used for obtaining the same effects such as a model MT13 with edge points EP13a and EP13b shown in FIG. 16.

Thus, according to this embodiment, a plurality of pattern edge models are used, or a single model in which a plurality of defined edge points are defined is used, so that the respective components can be simultaneously measured with respect to a pattern formed by a plurality of different shapes. Thus, the measuring time can be greatly shortened. It is also possible to measure the relationship between edges with respect to components having different shapes.

(C) Program and Recording Medium

A series of procedures in the above described pattern evaluation method may be incorporated in a program to be read by a computer capable of processing image data, to be executed. Thus, the pattern evaluation method according to the present invention can be realized by using a general purpose computer. In addition, a program causing a computer capable of processing image data to execute the series of procedures in the above described pattern evaluation method may be stored in a recording medium, such as a flexible disk or a CD-ROM, to be read and executed by the computer. The recording medium should not be limited to a portable recording medium, such as a magnetic disk or an optical disk, but it may be a fixed recording medium, such as a hard disk unit or a memory. In addition, a program including the above described series of procedures in the pattern evaluation method may be distributed via a communication line (including a radio communication),such as Internet. Moreover, a program including the series of procedures in the above described pattern evaluation method is encrypted, modulated or compressed to be distributed via a wire or radio line, such as Internet, or to be stored in a recording medium to be distributed.

While some embodiments of the present invention have been described, the invention should not be limited to the above described embodiments, and persons with ordinary skill in the art can modify the invention in various ways without departing from the spirit of the invention. While a SEM image acquired from a CDSEM apparatus has been used as an image of the pattern to be evaluated in the above described embodiments, the present invention should not be limited thereto. For example, the present invention may be applied to an optical image acquired by a general optical image pick-up device. Moreover, if the edge point detecting method in the embodiments is combined with the DAD method described in U.S. patent application Ser. No. 10/105, 387, it is possible to simultaneously measure a plurality of patterns, so that it is possible to further improve the precision and efficiency of evaluation of patterns.

What is claimed is:

1. A pattern evaluation system which receives image data of a pattern to be evaluated to evaluate the pattern, said pattern evaluation system comprising:

an edge model producing part which produces a pattern edge model in a form of an array of cells, said array having a relative intensity value stored therein and a position of an edge point being assigned thereto, the position of the edge point being defined as a coordinate value; and an edge point coordinate detecting part which carries out an image matching processing of an image of the pattern and said pattern edge model to detect coordinates of an edge point of the pattern by scanning the image of the pattern with said pattern edge model, wherein said pattern edge model or the scanning direction thereof is rotated by an arbitrary angular interval equal to or less than 180-degrees during the image matching processing.

2. A pattern evaluation system according to claim 1, wherein said edge model producing part produces said pattern edge model using the image of the pattern.

3. A pattern evaluation system according to claim 1, wherein said edge model producing part produces said pattern edge model corresponding to a magnification in measurement of the image of the pattern.

4. A pattern evaluation system according to claim 1, wherein the pattern has a plurality of edge shapes, said edge model producing part produces a plurality of said pattern edge models, and said edge point coordinate detecting part detects coordinates of a group of edge points of the edge shape corresponding to each of the plurality of said pattern edge models.

5. A pattern evaluation system according to claim 1, wherein the positions of a plurality of said edge points are assigned to said pattern edge model, and said edge point coordinate detecting part detects coordinates of said edge points of the pattern corresponding to each of said positions of said plurality of edge points.

6. A pattern evaluation system according to claim 1, wherein said edge point coordinate detecting part defines a value, which is obtained by an image processing capable of being defined for every pixel, as an edge parameter and adopts a teacher data from said edge parameter to calculate a Mahalanobis distance from said teacher data with respect to each pixel, said value including at least one of an intensity value of a pixel of an edge point assigned by a user, a dispersion value, and a matching score to said pattern edge model.

7. A pattern evaluation method comprising:

acquiring an image data of a pattern to be evaluated;

producing a pattern edge model in a form of an array of cells, said array having a relative intensity value stored therein and a position of an edge point being assigned thereto, the position of the edge point being defined as a coordinate value; and carrying out an image matching processing of an image of the pattern and said pattern edge model to detect coordinates of an edge point of the pattern by scanning the image of the pattern with said pattern edge model, wherein said pattern edge model or the scanning direction thereof is rotated by an arbitrary angular interval equal to or less than 180-degrees during the image matching processing.

8. A pattern evaluation method according to claim 7, wherein said pattern edge model is produced using an image of the pattern.

9. A pattern evaluation method according to claim 7, wherein said pattern edge model is produced in response to a magnification in measurement of an image of the pattern.

10. A pattern evaluation method according to claim 7, wherein the pattern has a plurality of edge shapes, a plurality of said pattern edge models are produced, and detecting said edge point coordinate includes detecting coordinates of a group of edge points in said plurality of edge shapes corresponding to each of said plurality of pattern edge models.

11. A pattern evaluation method according to claim 7, wherein a plurality of the positions of said edge points are assigned to said pattern edge model, and detecting said edge point coordinate includes detecting coordinates of said edge points of the pattern which correspond to each of said plurality of positions of said edge points assigned to said pattern edge model.

12. A pattern evaluation method according to claim 7, which further comprises:

defining a value, which is obtained by an image processing capable of being defined for every pixel, as an edge parameter, said value including at least one of an intensity value of a pixel of an edge point assigned by a user, a dispersion value, and a matching score with said pattern edge model;

adopting a teacher data from said edge parameter; and calculating a Mahalanobis distance from said teacher data with respect to each pixel.

13. A program contained on a computer readable medium which causes a computer to execute a pattern evaluation method comprising:

acquiring an image data of a pattern to be evaluated;

producing a pattern edge model in a form of an array of cells, said array having a relative intensity value stored therein and a position of an edge point being assigned thereto, the position of the edge point being defined as a coordinate value; and carrying out an image matching processing of an image of the pattern and said pattern edge model to detect coordinates of an edge point of the pattern by scanning the image of the pattern with said pattern edge model, wherein said pattern edge model or the scanning direction thereof is rotated by an arbitrary angular interval equal to or less than 180-degrees during the image matching processing.

14. A program contained on a computer readable medium according to claim 13, wherein said pattern edge model is produced using an image of the pattern.

15. A program contained on a computer readable medium according to claim 13, wherein said pattern edge model is produced in response to a magnification in measurement of an image of the pattern.

16. A program contained on a computer readable medium according to claim 13, wherein the pattern has a plurality of edge shapes, a plurality of said pattern edge models are produced, and detecting said edge point coordinate includes detecting coordinates of a group of edge points in said plurality of edge shapes corresponding to each of said plurality of pattern edge models.

17. A program contained on a computer readable medium according to claim 13, wherein a plurality of the positions of said edge points are assigned to said pattern edge model, and detecting said edge point coordinate includes detecting coordinates of said edge points of the pattern which correspond to each of said plurality of positions of said edge points assigned to said pattern edge model.

* * * * *